United States Patent Office 3,305,601
Patented Feb. 21, 1967

3,305,601
THERMOSET COMPOSITIONS BASED ON CARBOXY POLYMERS AND EPOXIDE RESINS
Darrell D. Hicks, Louisville, Ky., assignor to Celanese Coatings Company, New York, N.Y., a corporation of Delaware
No Drawing. Filed June 9, 1966, Ser. No. 556,287
7 Claims. (Cl. 260—837)

This invention is a continuation-in-part of my application Serial No. 811,536, filed May 7, 1959, now abandoned, my application Serial No. 197,278, filed May 24, 1962, now abandoned, and my application Serial No. 416,908, filed December 8, 1964, now abandoned.

This invention relates to new coating compositions and to their preparation. More particularly, it relates to thermoset compositions based on carboxy polymers and epoxide resins of improved hardness, mar resistance, impact resistance and solvent resistance, and which carboxy-epoxy systems are capable of being cured at room temperature.

According to the present invention, carboxy copolymers are prepared containing at least about 20 percent and preferably about 30 percent by weight carboxylic acid of that used to prepare the copolymer based on the weight of the copolymer and the copolymer is reacted with a polyepoxide to produce insoluble thermosetting compositions and films.

The carboxy polymers reacted with polyepoxides according to the present invention are formed by reacting a polymerizable ethylenically unsaturated monomer with acrylic acid, methacrylic acid, or crotonic acid, i.e., alpha-beta unsaturated monocarboxylic acids having a single double bond and not more than four carbon atoms.

Copolymerized with the alpha-beta unsaturated acids are ethylenically unsaturated monomers copolymerizable therewith. Particularly important are vinyl aromatic compounds, for instance, styrene, the halostyrenes, etc., having a single vinyl group and free of other substituents capable of reacting with an unsaturated acid, i.e., a monofunctional vinyl aromatic compound. Also valuable are saturated alcohol esters of acrylic, methacrylic and crotonic acids. Examples of monofunctional vinyl aromatic monomers are isopropenyl toluene, the various dialkyl styrenes, ortho-, meta-, and para-chloro styrenes, bromo styrenes, and fluoro styrenes, the cyano styrenes, and vinyl naphthalene. Among other monomers are the various alpha-substituted styrenes, e.g., alpha-methyl styrenes and alpha-methyl paramethyl styrenes. Acrylic, methacrylic, and crotonic esters of saturated alcohols include the methyl, ethyl, propyl, isopropyl, n-butyl, isobutyl, (sec) butyl, (tert) butyl, amyl, hexyl, heptyl, octyl, decyl, dodecyl, etc. esters of acrylic, methacrylic and crotonic acids. Preferred monomers include these alpha-beta unsaturated monocarboxylic acid esters of saturated monohydric alcohols, the acids having not more than 4 carbon atoms and the alcohols having not more than 20 carbon atoms and monofunctional vinyl aromatic compounds since, as will be shown, resulting films are more flexible.

Other known monomers which can be used in the preparation of the carboxy-polymer as is well known in the art include vinyl aliphatic cyanides of not more than four carbon atoms, for example, acrylonitrile and methacrylonitrile. Unsaturated monohydric alcohol esters of saturated monocarboxylic acids are also intended wherein the alcohols contain a single double bond and not over three carbon atoms, and the acids have not more than twenty carbon atoms, for instance, vinyl acetate, vinyl stearate, and the allyl, methallyl, and crotyl esters of propionic, butyric and other acids. And, of course, not only the monomers themselves, but mixtures of the monomers can be copolymerized with the alpha-beta unsaturated acids to form the carboxy polymer. A desirable polymer includes acrylic acid, methyl methacrylate, and vinyl toluene, the desideratum being that the unsaturated acid is present in an amount of about 20 percent by weight or more based on the total copolymer weight. Thus, based on 100 parts by weight of monomers, an amount above about 20 parts are acrylic or other acid and the remaining parts by weight are one or more of the other monomers mentioned hereinbefore.

Since carboxy polymers are well known, their preparation need not be discussed at length herein. Polymerization is effected by conventional solution polymerization techniques using a peroxide catalyst such as benzoyl or ditertiary butyl peroxide and a temperature usually between about 15° C. to 130° C. Suitable solvents are the known polar solvents, for example, diisobutyl ketone, methyl isobutyl ketone, hydroxy ethyl acetate, 2-ethoxyethyl acetate, propylene glycol methyl ether, diethyl ether of ethylene glycol, propylene glycol methyl ether, butyl alcohol and isopropyl alcohol. In other words, the solvents are ethers, esters, ketones or alcohols, or mixtures of these with aromatic hydrocarbons such as xylene, the ethers, esters, ketones and alcohols having boiling points of 55° C. to 200° C., generally 120° C. to 160° C.

Among the polyepoxides which can be used in admixture with the polymer are glycidyl polyethers of polyhydric alcohols and polyhydric phenols prepared by reacting the alcohol or phenol with a halohydrin such as epichlorohydrin in the presence of an alkali. These are well known epoxide resins described in such patents as U.S. 2,467,171, U.S. 2,538,072, U.S. 2,582,985, U.S. 2,615,007, U.S. 2,698,315, U.S. 2,581,464. In addition to epoxy (i.e., oxirane) ethers, epoxy esters are included. Desirable epoxy esters can be made by the epoxidation of unsaturated esters by reaction with a peracid such as peracetic acid or performic acid, desirable esters thus prepared being 3,4-epoxy-cyclohexylmethyl-3,4-epoxy-cyclohexane carboxylate and 3,4-epoxy-6-methylcyclohexylmethyl-3,4-epoxy-6-methylcyclohexane carboxylate.

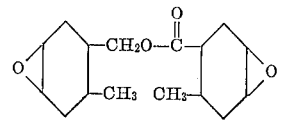

Other epoxy compounds included are, for example

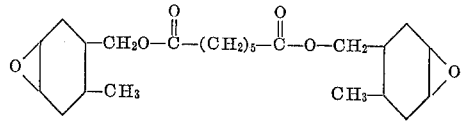

and the diglycidyl ether of trimethylol propane, dicyclopentadiene diepoxide, bisepoxydicyclopentyl ether of ethylene glycol and epoxidized drying oils, such as epoxidized soya oil and the like of less than twenty carbon atom acids.

The most advantageous polyepoxide for producing room temperature curable compositions are glycidyl ethers of alcohols and phenols and glycidyl esters of the acids.

The preferred acid level of the carboxy copolymers is about 30 percent. Carboxy copolymers containing as low as 20 percent carboxylic acid monomer can be used and will cure at room temperature but at 30 percent acid the room temperature curing is considerably faster and therefore more advantageous. Higher acid levels up to about 40 percent and above can also be used and rapid room temperature curing obtained and the only reason for preferring acid levels at about 30 percent is the increased cost of preparing the higher acid content copolymers, the necessity of using more expensive solvents and the decreased pot life of the compositions before application. The acid content of the copolymers is determined by the percent carboxylic acid by weight based on the total weight of the copolymer.

The ratio of carboxy copolymer and polyepoxide which can be employed can vary within fairly wide limits depending upon the properties desired of the cured product and can readily be determined by routine experimentation by those skilled in the art. Generally, it is advisable to employ about 0.7 to 2 equivalents of polyepoxide to 1 equivalent of the carboxy copolymer and a ratio of 1 to 1.5 equivalents of the polyepoxide to 1 equivalent of the carboxy copolymer is preferred.

The carboxy copolymer and the polyepoxide are mixed together with a suitable solvent and with a catalyst, formed into the shape desired, such as a coating or film, and allowed to cure at room temperature. If the coatings are to be cured by heating, a catalyst is not necessary. However, for rapid cures and uniformly cured films, a catalyst is advantageous.

The catalysts which are used are basic materials, for example, amines, amine salts, quaternary ammonium hydroxides or quaternary ammonium salts. However, since primary and secondary amines enter into the reaction, preferred catalysts are tertiary amines, tertiary amine salts, and quaternary ammonium compounds, e.g., quaternary ammonium hydroxide, and quaternary ammonium salts. Examples of suitable catalysts are trimethyl amine, dimethylethyl amine, triethyl amine, ethyl dipropyl amine, benzyltrimethyl ammonium hydroxide, benzyl trimethyl ammonium chloride, piperidine, benzyltrimethyl ammonium acetate, benzyltriethyl ammonium formate, tripropylbenzyl ammonium chloride, ethyl pyridine chloride, benzyl dimethyl ammonium hexoate, alpha-methylbenzyldimethyl ammonium 2-ethyl hexoate, etc. The catalysts are used in catalytic amounts, generally from about 0.1 to about 2 percent, and preferably 0.5 about to 1.5 percent, by weight based on the sum of the weights of the carboxy copolymer and the polyepoxide.

The following examples illustrate in greater detail the preparation of typical carboxy polymers and films.

The polyepoxides used in the following examples were prepared by the condensation of various proportions of epichlorohydrin to p,p'-dihydroxydiphenyl propane (Bisphenol A) and subsequent dehydrohalogenation with sodium hydroxide. The table which follows indicates the ratio of epichlorohydrin to Bisphenol A used to prepare the polyepoxides, and in the examples which follow, the polyepoxides will be referred to by their epoxide equivalents. Thus, an epoxide having an epoxide equivalent of 190 will be termed "Epoxide 190."

| Polyepoxide | Bisphenol A | Epichlorohydrin | Epoxide Equivalent |
|---|---|---|---|
| Epoxide 190 | 1 mol | 10 mols | 190 |
| Epoxide 327 | 1 mol | 2 mols | 327 |
| Epoxide 340 | 1 mol | 2.04 mols | 340 |

EXAMPLE 1

(A) *Carboxy copolymer preparation*

| Material: | Weight (grams) |
|---|---|
| Vinyl toluene | 90.0 |
| Methyl acrylate | 30.0 |
| Acrylic acid | 30.0 |
| Benzoyl peroxide | 3.0 |
| Xylene | 112.5 |
| Methyl isobutyl ketone | 37.5 |

Into a 500 ml. round-bottomed, 3 neck flask fitted with a mechanical agitator, thermometer, condenser and dropping funnel are charged the xylene and methyl isobutyl ketone. The flask contents are heated to 115° C. In an Erlenmeyer flask, the vinyl toluene, methylacrylate, acrylic acid and benzoyl peroxide are combined and agitated until all of the peroxide is in solution. The monomer-catalyst solution is added by means of the dropping funnel to the hot solvent while stirring over a period of one hour, maintaining the reaction temperature between about 115° C. and 120° C. After all of the monomer catalyst solution is added, the reflux is continued for an additional 3 hours at a temperature of about 126° C. after which the flask contents are cooled to room temperature. The 60/20/20 vinyl toluene/methylacrylate/acrylic acid copolymer solution has a theoretical solids content of 50% and a theoretical weight per carboxyl group of 360 (based on solids).

(B) *Cured film preparation*

In a suitable container 20 grams of the carboxy copolymer solution of this example (50% solids) and 13.4 grams of a 75% xylene solution of Epoxide 327 are combined in the presence of 6.0 grams of 2-ethoxy ethanol acetate, 10.6 grams of xylene and 0.3 gram of a 60% aqueous solution of benzyl trimethyl ammonium chloride. A 3 mil film of the solution is drawn down on a glass plate and is baked at 150° C. for 30 minutes. The cured film possesses excellent flexibility hardness, mar resistance, solvent resistance and adhesion properties.

EXAMPLE 2

(A) *Carboxy copolymer preparation*

| Material: | Weight (grams) |
|---|---|
| Styrene | 90.0 |
| Methyl acrylate | 30.0 |
| Acrylic acid | 30.0 |
| Benzoyl peroxide | 3.0 |
| Xylene | 112.5 |
| Methyl isobutyl ketone | 37.5 |

Using the procedure of Example 1, from the above named materials, a 50 percent solution of a 60/20/20 styrene/methyl acrylate/acrylic acid copolymer is made. The resulting copolymer solution is, however, uniformly cloudy at 25° C. Based on solids, the copolymer has a theoretical weight per carboxyl group of 360.

(B) *Cured film preparation*

Following the procedure of Example 1, 20.0 grams of the carboxy copolymer solution of this example and 13.4 grams of the 75 percent solution of Epoxide 327 in xylene are combined with 8.6 grams of 2-ethoxyethanol acetate and 8.0 grams of xylene in the presence of 0.3 grams of a 60 percent aqueous solution of benzyl trimethyl ammonium chloride. This mixture of materials forms a perfectly clear solution. From this solution, a film is drawn down on a glass plate with a 3 mil blade and is baked for 30 minutes at 150° C. The cured film has properties identical to those found for film produced in Example 1–B.

EXAMPLE 3

(A) *Carboxy copolymer preparation*

| Material: | Weight (grams) |
|---|---|
| Vinyl toluene | 82.5 |
| Methyl acrylate | 30.0 |
| Acrylic acid | 37.5 |
| Benzoyl peroxide | 3.0 |
| Xylene | 112.5 |
| Methyl isobutyl ketone | 37.5 |

A 50 percent solution of a 55/20/25 vinyl toluene/methyl acrylate/acrylic acid copolymer is prepared from the above named materials following the procedure of Example 1. The copolymer, based on solids, has a theoretical weight per carboxyl group of 288.

(B) Cured film preparation

In accordance with the procedure of Example 1, 17.6 grams of the carboxy copolymer solution of this example and 15.0 grams of a 75 percent xylene solution of Epoxide 327 are combined with 8.9 grams of xylene, 10.5 grams of 2-ethoxyethanol acetate and 0.3 gram of a 60 percent aqueous solution of benzyl trimethyl ammonium chloride. From this solution, a film is drawn down on a glass plate with a 3 mil blade and is baked for 30 minutes at 150° C. The cured film is very flexible, and exhibits exceptional hardness, mar resistance, and adhesion properties.

To illustrate the improved properties of the cured films resulting from the use of the higher carboxyl content copolymers of this invention, from each of the film forming solutions of the preceding examples, films are rolled onto 3" x 5" electrolytic tin plate panels using a gelatin roller. These films are cured by baking at 150° C. for 30 minutes. The cured films are then subjected to a "wedge bend test." In this test, the panel is bent over a mandrel to form a ⅛" bend with the planes of the panel on each side of the bend now being parallel to each other ⅛" apart. The bent panel is then subjected to impact, while being held in a wedge, so that the planes of the panel touch at one end and are ⅛" apart at the other end forming a tapered or wedge bend. The bend of the film is then examined for breakage after being immersed in acid solution of copper sulfate for 1 minute, the length of the break of the film being measured in millimeters (mm.).

The cured films are also subjected to an impact test with a Gardner Variable Impact Tester which uses a ½" round nosed steel rod weighing two pounds dropping a maximum distance of 28 inches. After impact, the films are examined for flaking or cracking at the point of impact.

The table of this example indicates the results of these tests on the film forming solutions of the preceding examples.

| Film Forming Solution of Example | Percent Acid in Copolymer | Wedge Bend Test, mm. Breakage | Bump Test 28 inch pound |
| --- | --- | --- | --- |
| 1 | 20 | 10-12 | Pass. |
| 2 | 20 | 10-15 | Do. |
| 3 | 25 | 25-30 | Do. |

Another feature of the invention is the discovery that polymers containing a short chain alkyl ester of acrylic, methacrylic or crotonic acid render films more flexible. Some of the preceding polymers contain this ester and the following examples further illustrate this aspect of the invention.

EXAMPLE 4

(A) Carboxy copolymer preparation

| Material: | Weight (grams) |
| --- | --- |
| Vinyl toluene | 120.0 |
| Methyl acrylate | 105.0 |
| Methacrylic acid | 75.0 |
| Di-tert-butyl peroxide | 12.0 |
| Xylene | 123.0 |
| 2-ethoxyethanol acetate | 122.0 |

A 40/35/25 vinyl toluene/methylacrylate/methacrylic acid 55 percent copolymer solution is prepared following the procedure of Example 1 but employing the components of this example. The copolymer (based on solids) has a theoretical carboxy equivalent of 344.

(B) Cured film preparation

In a suitable container, according to Example 1, 21.7 grams of the 40/35/25 vinyl toluene/methyl acrylate/ methacrylic acid copolymer solution of this example and 13.4 grams of a 75 percent xylene solution of Epoxide 327 are combined with 14.9 grams of 2-ethoxyethanol acetate and 0.3 gram of a 60 percent aqueous solution of benzyltrimethyl ammonium chloride. From this solution, a 3 mil film is drawn down on a glass plate and is baked for 30 minutes at 150° C. The resulting well cured film exhibits exceptional hardness, mar resistance and adhesion and has excellent flexibility.

EXAMPLE 5

(A) Carboxy copolymer preparation

| Material: | Weight (grams) |
| --- | --- |
| Vinyl toluene | 120.0 |
| Acrylic acid | 30.0 |
| Benzoyl peroxide | 3.0 |
| Xylene | 150.0 |
| Methyl isobutyl ketone | 50.0 |

According to the procedure of Example 1, a 42 percent solution of an 80/20 vinyl toluene/acrylic acid copolymer is prepared. However, in this case, the monomer-catalyst mixture is introduced into the solvent at a temperature of 125° C. to 135° C., the final reaction temperature being 132° C. The carboxy copolymer (based on solvents) has a theoretical weight per carboxyl group of 360.

(B) Cured film preparation

Following the procedure of Example 1, 23.8 grams of the copolymer solution of this example, 13.4 grams of the 75 percent xylene solution of Epoxide 327 and 0.3 gram of a 60 percent aqueous solution of benzyl trimethyl ammonium chloride are combined in the presence of 9.8 grams of 2-ethoxyethanol acetate and 3.0 grams of diacetone alcohol. From this solution, a 3 mil film is drawn down on a glass plate and is cured by baking at 150° C. for 30 minutes. The cured film has excellent hardness, mar resistance, and adhesion properties.

Another important aspect of the invention resides in the use of vinyl toluene, instead of styrene. Vinyl toluene imparts to the copolymer much more desirable solubility properties. This is best illustrated by the following solvent tolerance tests. Tolerances were measured at 25° C. by starting with 50 percent concentrations of the copolymers in a mixture of 75% xylene and 25% methyl isobutyl ketone and thinning until the copolymer solution became cloudy, indicating incompatibility. The styrene-containing copolymer (50% solids) on addition of xylene becomes cloudy at 39 to 40% solids, whereas a copolymer solution wherein vinyl toluene is substituted for styrene can be reduced to 28 to 29 percent solids before becoming cloudy.

Considering now the higher acid content copolymers which require a more polar solvent, the copolymer solution of Example 2 was cloudy when cooled at 25° C. so that a stronger solvent was used in part B of that example. Thus, using a mixture of 75 percent xylene and 25 percent methyl isobutyl ketone, the tolerance is definitely above 50 percent solids, whereas the corresponding vinyl toluene copolymer solution (20 percent acrylic acid) of Example 1 was reduced to 37 to 38 percent solids before becoming cloudy. The 25 percent acrylic acid copolymer solution of Example 3 containing vinyl toluene was made as a clear 50 percent solids solution in a mixture of 75 percent xylene and 25 percent methyl isobutyl ketone. Yet, in the case of the styrene copolymer, even the 20 percent acrylic acid level copolymer is even more insoluble. Thus, the vinyl toluene copolymer is unique. A series of three acrylic acid copolymers containing acrylic acid in levels of 20 to 30 percent was prepared using the procedure and catalyst set forth in Example 1, except that a 50 percent xylene, 50 percent ethylene-glycol monoethyl ether acetate solvent mixture was used instead of straight xylene. These copolymer compositions are exemplified as follows:

COPOLYMERS

| Example | Percent VT | Percent MA | Percent AA | Percent Solids* | Gardner-Holdt Viscosity |
|---|---|---|---|---|---|
| 6 | 60 | 20 | 20 | 50.0 | $Z_3$-$Z_5$. |
| 7 | 55 | 20 | 25 | 50.0 | $Z_6$+. |
| 8 | 50 | 20 | 30 | 50.0 | $Z_6$+. |

*In 50 percent xylene and 50 percent ethylene glycol monoethyl ether acetate.
VT=vinyl toluene. MA=methyl acrylate. AA=acrylic acid.

Each of the copolymers of the series was then blended with Epoxide 190 on a one carboxyl group per epoxide group basis. The blend was then reduced to 50 percent solids with the xylene-ethylene glycol monoethyl ether acetate solvent (50 percent of xylene and 50 percent of ether acetate). To catalyze the mixture, 1 percent benzyl trimethyl ammonium chloride, based on total solids, was added. This was employed as a 60 percent aqueous solution. Wet films of 3 mil thickness were drawn down on glass panels. The films were baked 30 minutes at 150° C. and acetone resistance tests were run. Two mil thick wet films were also drawn down on electrolytically tinned plate and baked 30 minutes at 150° C. These films were tested for Gardner Impact resistance. Compositions and results are tabulated below.

RESISTANCE TESTS

| Example | Percent Acid in Copolymer | Gardner Impact, Inch Pound | Solvent Resistance Acetone |
|---|---|---|---|
| 6 | 20 | 10-12 | 80 to 85.* |
| 7 | 25 | 12-14 | 1,200 to 1,500.* |
| 8 | 30 | 6-8 | 3,000 to 3,300.* |

*Time in seconds for a ½ inch cube of felt material kept saturated with the solvent to soften a portion of film to HB pencil hardness.

A film of polyepoxide with a copolymer containing 25 percent acid passed a 12 inch/pound bump test, failing a 14 inch/pound bump test. The impact resistance of the film of the polyepoxide-copolymer composition wherein the copolymer contains 30 percent acid, drops back down in impact resistance passing a 6 inch/pound bump test, but failing an 8 inch/pound bump test. The solvent resistance test even more dramatically illustrates the superior results obtained by using in excess of 20 percent acid in the copolymer. A film made from a 25 percent acid copolymer composition softens to an HB pencil hardness in 1200 to 1500 seconds. On the basis of the foregoing impact and acetone resistance, hardness and solvent resistance properties can be obtained by the use of a copolymer containing in excess of about 20 percent acid.

Another advantage of this invention is that whereas the low acid level copolyer-polyepoxide compositions must be cured by baking at 100° C. to 150° C., the compositions of this invention containing a high acid level copolymer in excess of 20 percent can be cured at room temperature. Room temperature cured films possess a mar resistance and hardness indicating a quite high degree of cross-linking. These high acid level copolymer-polyepoxide systems will, therefore, lend themselves to two-package room temperature cure systems.

The high acid content copolymers prepared as described with respect to Examples 6, 7 and 8 were drawn down on glass panels as wet films. These films were left at room temperature (25° C.) for 12 days and were tested for cured properties. The mar resistance of Examples 6 and 7 was fair and the mar resistance of Example 8 was good. The ribbon properties of Examples 6 and 7 were fair and the ribbon properties of Example 8 were good. The mar resistance was determined by scratching the films with a fingernail. The ribboning properties were determined by cutting the films with a knife. Uncured or poorly cured films flake off and will not form a ribbon. Cured films, however, will slice off in a ribbon.

Additional high acid content copolymers were prepared and were tested as air drying or room temperature curing compositions in admixture with epoxide resins as follows wherein parts are by weight.

EXAMPLE 9

*30 percent acrylic acid*

To a suitable reaction flask equipped with a thermometer, stirrer, condenser and dropping funnel are added 150 parts of xylene and 150 parts of ethylene glycol monoethyl ether acetate. To the dropping funnel are added 90 parts of vinyl toluene, 120 parts of butyl acrylate, 90 parts of acrylic acid and 6 parts of benzoyl peroxide. Heat is applied to the flask and at 120° C., addition of the monomer-catalyst solution is begun. The addition is completed in 1 hour and 40 minutes. The temperature is then held at 115° C. to 120° C. for 5 hours. At the end of this heating period, the copolymer has a Gardner-Holdt viscosity of $Z_6$ and a solids content of 50 percent indicating 100 percent conversion of monomers to polymers.

To 22.4 parts of the copolymer solution are added 11.2 parts of Epoxide 190 (1.26 epoxide equivalents per 1 acid equivalent), 0.3 part of a 60 percent aqueous solution of benzyl trimethyl ammonium chloride and 11.2 parts of xylene. Films are drawn down on electrolytic tin plate with a 2 mil doctor blade and are left at room temperature (25° C.). The films are tack free after 1 hour. After 2 weeks, the pencil hardness is 2H–3H, and the films are unaffected by soaking in water and 10 percent caustic solution (5 day soak). After standing for 3 weeks, the films are soaked in methyl isobutyl ketone for 1 minute. The pencil hardness drops only from 4H to 3H indicating good solvent resistance.

EXAMPLE 10

*30 percent acid*

Using the same procedure as described in Example 9, a copolymer is prepared from 60 parts vinyl toluene, 30 parts ethyl acrylate, 120 parts butyl acrylate and 90 parts acrylic acid using 6 parts of benzoyl peroxide catalyst and 150 parts xylene and 150 parts of ethylene glycol monoethyl ether. The resulting copolymer solution has a Gardner-Holdt viscosity of U at 48.5 percent solids.

A blend is prepared from the copolymer solution (19.4 parts) and 10.3 parts of Epoxide 190 (1 epoxide equivalent per each acid equivalent) with 0.3 part of benzyl trimethyl ammonium chloride catalyst (60 percent solution in water). 2 mil films are drawn down on glass and electrolytic tin plate. After 2 weeks at 25° C., the films have a pencil hardness of 2H–3H and pass a 28 inch/pound impact test. The films are unaffected by a 5 day soak in water.

EXAMPLE 11

*40 percent acid*

As described in Example 9, a copolymer solution is prepared from 60 parts of vinyl toluene, 120 parts of butyl acrylate and 120 parts of acrylic acid with 6 parts of benzoyl peroxide in 150 parts of xylene and 150 parts of ethylene glycol monoethyl ether. The resulting copolymer solution has a Gardner-Holdt viscosity of Y to Z at 50 percent solids.

A blend is prepared from 19.4 parts of the copolymer solution and 10.3 parts of Epoxide 190 (1 epoxide equivalent per acid equivalent) with 0.3 part of benzyl trimethyl ammonium chloride (60 percent solution in water). 2 mil films are drawn down on glass and electrolytic tin plate. The films are tack free after 2 hours at 25° C. After 2 weeks at 25° C., the films have a pencil hardness of 2H–3H, they pass a 28 inch/pound impact test and are not affected by a 5 day soak in water.

It is to be understood that the foregoing detailed description is given merely by way of illustration and that many variations may be made therein without departing from the spirit of the invention.

The embodiments of the invention in which an exclusive property or privilege is claimed are defined as follows:

1. A film forming composition capable of curing at room temperature wherein the film forming components consist essentially of
   (A) a carboxy containing copolymer which is a polymerization product of an alpha-beta monoethylenically unsaturated monocarboxylic acid having not more than four carbon atoms and a monoethylenically unsaturated monomer copolymerizable therewith and containing about 20 to about 30 weight percent carboxylic acid based on the total copolymer weight,
   (B) a polyepoxide containing more than one 1,2 epoxy group per molecule and being selected from at least one member of the group consisting of glycidyl polyethers of polyhydric phenols, glycidyl polyethers of polyhydric alcohols, glycidyl esters of carboxylic acids epoxy esters, and
   (C) a catalyst selected from the group consisting of amines, amine salts, quaternary ammonium hydroxides and quaternary ammonium salts, wherein
(A) and (B) are present in the proportions of 1 carboxy equivalent to about 0.7 to 2 epoxy equivalents and wherein (C) is present in the amount of 0.1 to 2 weight percent based on the sum of the weights of (A) and (B).

2. The composition of claim 1 in which the percent carboxylic acid is 30 percent.

3. The composition of claim 1 which is dissolved in a solvent for the copolymer and polyepoxide.

4. The composition of claim 1 wherein about 1 to about 1.5 epoxy equivalents of the polyepoxide are present for each carboxy equivalent of the carboxy containing copolymer and the catalyst is present in the amount of about 1 percent based on the sum of the weights of the polyepoxide and the copolymer.

5. The composition of claim 1 in which the unsaturated acid is acrylic acid, the unsaturated monomer copolymerizable therewith is a mixture of styrene and butyl acrylate, the polyepoxide is a diglycidyl ether of a dihydric phenol and the catalyst is a tertiary amine.

6. The method of producing cured resinous products which comprises blending the carboxy containing copolymer, the polyepoxide and the catalyst of claim 1 in the proportions of claim 1, forming the blend into the shape desired and curing the blend at room temperature.

7. The cured resinous reaction product of claim 6.

References Cited by the Examiner

UNITED STATES PATENTS 2,604,457    7/1952    Segall _____ 260—836

MURRAY TILLMAN, *Primary Examiner.*

P. LIEBERMAN, *Assistant Examiner.*

UNITED STATES PATENT OFFICE
CERTIFICATE OF CORRECTION

Patent No. 3,305,601  February 21, 1967

Darrell D. Hicks

It is certified that error appears in the above identified patent and that said Letters Patent are hereby corrected as shown below:

Column 9, line 26, after "acids" insert -- and --.

This certificate supercedes the Certificate of Correction issued April 23, 1968.

Signed and sealed this 3rd day of March 1970.

(SEAL)
Attest:

Edward M. Fletcher, Jr.  WILLIAM E. SCHUYLER, JR.
Attesting Officer  Commissioner of Patents